United States Patent
Liquicia et al.

(10) Patent No.: US 8,558,517 B2
(45) Date of Patent: Oct. 15, 2013

(54) POWER SUPPLY WITH VIRTUAL BY-PASS SYSTEM

(75) Inventors: Marcos Agoo Liquicia, New Taipei (TW); Chien-Ta Liang, New Taipei (TW)

(73) Assignee: Compuware Technology Inc., New Taipei (TW)

( * ) Notice: Subject to any disclaimer, the term of this patent is extended or adjusted under 35 U.S.C. 154(b) by 236 days.

(21) Appl. No.: 13/233,029

(22) Filed: Sep. 15, 2011

(65) Prior Publication Data
US 2013/0070497 A1    Mar. 21, 2013

(51) Int. Cl.
*G05F 1/40*    (2006.01)
(52) U.S. Cl.
USPC ............ 323/224; 323/272; 323/284; 323/299
(58) Field of Classification Search
USPC ................. 323/222, 224, 225, 272, 282, 284, 323/299–303
See application file for complete search history.

(56) References Cited

U.S. PATENT DOCUMENTS

| | | | | |
|---|---|---|---|---|
| 6,147,882 A  * | 11/2000 | Huber et al. | ................... | 363/39 |
| 6,504,497 B2 * | 1/2003 | Jang et al. | ..................... | 341/125 |
| 7,061,212 B2 * | 6/2006 | Phadke | ....................... | 323/222 |
| 7,330,366 B2 * | 2/2008 | Lee et al. | ..................... | 363/101 |
| 7,408,795 B2 * | 8/2008 | Vinciarelli | .................... | 363/125 |

* cited by examiner

*Primary Examiner* — Jessica Han
(74) *Attorney, Agent, or Firm* — Leong C. Lei

(57) ABSTRACT

The power supply comprises a bridge rectifier connected to an AC source; a boost converter series-connected to the bridge rectifier comprising an inductance coil; a filter capacitor series-connected to the boost converter; a DC/DC converter connected to a load; a hold-up-time enhancer connected to and positioned between the filter capacitor and the DC/DC converter; and a virtual by-pass system parallel-connected to the hold-up-time enhancer comprising an induction coil inductively coupled to the inductance coil of the boost converter. As such, voltage is induced on the induction coil by the inductance coil in the boost converter and the virtual by-pass system parallel-connected to the hold-up-time enhancer is thereby turned on and off.

6 Claims, 5 Drawing Sheets

POWER SUPPLY WITH VIRTUAL BY-PASS SYSTEM

(a) TECHNICAL FIELD OF THE INVENTION

The present invention is generally related to power supplies, and more particularly to a power supply equipped with a virtual by-pass system for enhancing the power supply's hold-up time.

(b) DESCRIPTION OF THE PRIOR ART

A conventional power supply is required to have a certain hold-up time, meaning that the power supply can maintain output within a specified voltage range after a drop-out of input power for a period of time, usually at least 12 ms. The hold-up time enables a system to continue running without resetting or rebooting if a brief interruption of input power occurs.

Hold-up time is directly proportional to the usable energy stored in the filter capacitor while the usable energy is directly proportional to the square of the difference between the maximum and minimum voltages of the DC/DC converter's operational range. Therefore, to maintain a certain hold-up time, the DC/DC converter has to be designed with a wider operational range. However, this wider operational range is at the cost of diminished efficiency of the DC/DC converter.

SUMMARY OF THE INVENTION

The major objective of the present invention is to enhance hold-up time, to improve power supply overall efficiency, and to maintain constant output power.

The second objective is to increase hold-up time significantly and to maintain stable output by a virtual grounding manner without sacrificing power.

To achieve the objectives, the power supply comprises a bridge rectifier connected to an AC source; a boost converter series-connected to the bridge rectifier comprising an inductance coil; a filter capacitor series-connected to the boost converter; a DC/DC converter connected to a load; a hold-up-time enhancer connected to and positioned between the filter capacitor and the DC/DC converter; and a virtual by-pass system parallel-connected to the hold-up-time enhancer comprising an induction coil inductively coupled to the inductance coil of the boost converter. As such, voltage is induced on the induction coil by the inductance coil in the boost converter and the virtual by-pass system parallel-connected to the hold-up-time enhancer is thereby turned on and off.

Preferably, the virtual by-pass system further comprises a virtual by-pass switch having a first by-pass terminal connected to the filter capacitor and a second by-pass terminal connected to the DC/DC converter; a DC restorer connected to the induction coil; and a gate drive control connected to and positioned between the virtual by-pass switch and the DC restorer.

Preferably, the boost converter further comprises a FET and a diode; and the FET is a MOSFET.

Preferably, the hold-up-time enhancer comprises an inductance coil, a FET, and a diode; and the FET is a MOSFET.

Preferably, the virtual by-pass switch comprises a FET and the FET is a MOSFET.

Preferably, the gate drive control comprises at least a BJT and at least a diode.

The gist of the present invention lies in the integration of the hold-up-time enhancer and the virtual by-pass system so that, after the AC source drops, the power supply's performance in terms of its hold-up time is significantly enhanced.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
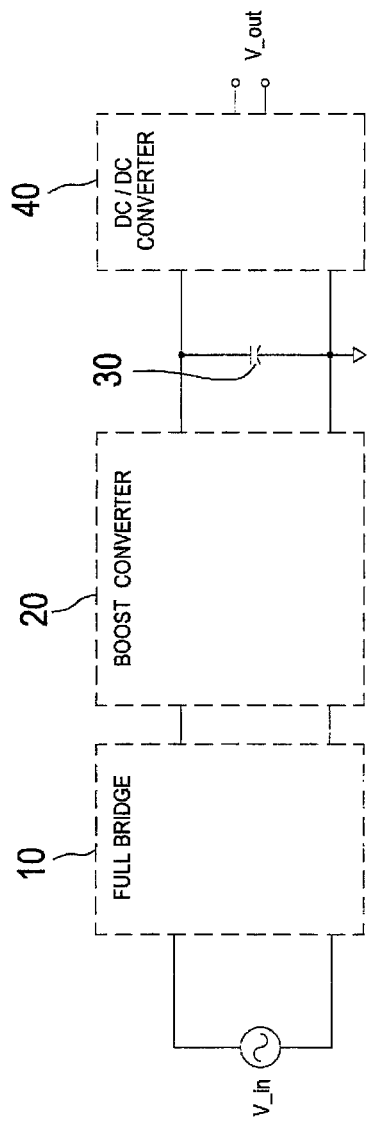
FIG. 1 is a functional diagram of a conventional power supply.

As shown in FIG. 1, a conventional power supply, contains in series a bridge rectifier 10 connected to an AC source V_in, a boost converter 20, a filter capacitor 30, and a DC/DC converter 40 connected to an output load V_out.

Figure 2:
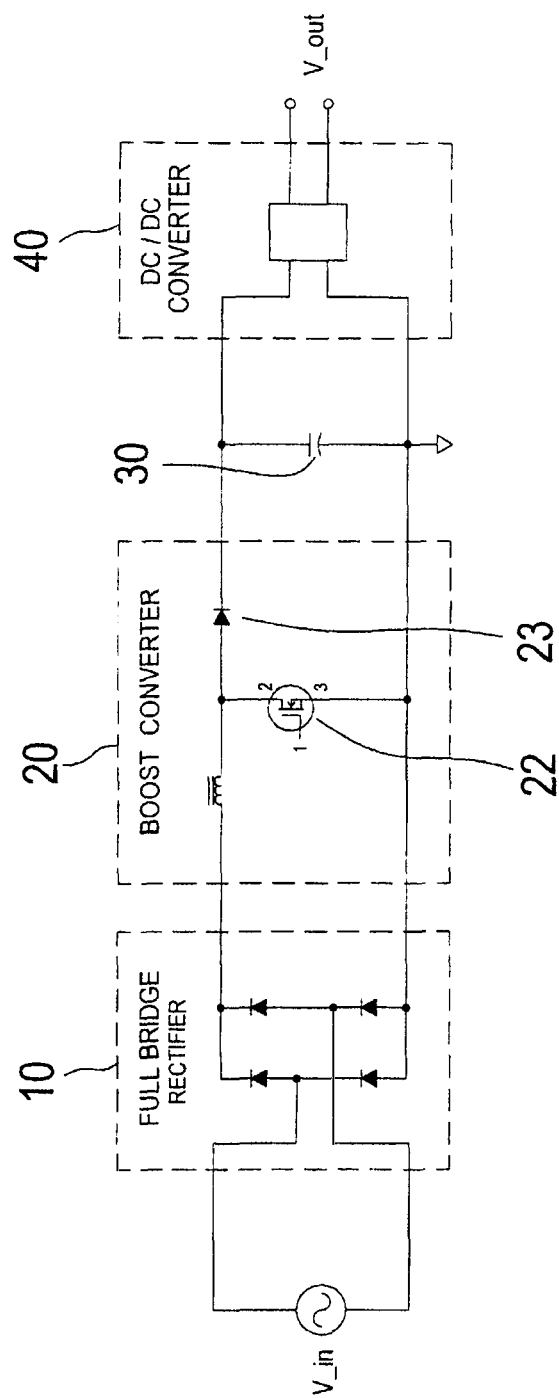
FIG. 2 is a schematic diagram of the conventional power supply of FIG. 1.

More specifically, as shown in FIG. 2, the bridge rectifier 10 is a full-bridge rectifier and the boost converter contains an inductance coil 21, a FET 22 (preferably a MOSFET), and a diode 23. The boost converter t20 takes the DC input voltage from the bridge rectifier 10 and converts the DC input voltage into a higher and adjusted DC output voltage as follows. When the FET 22 functioning as a switch is conducted, the DC input voltage is applied to the inductance coil 21 and the diode 23 is thereby reverse-biased and cut off. The inductance coil 21 stores the energy from the AC source V_in. When the FET 22 is turned off, the stored energy in the inductance coil 21 forward-biases and conducts the diode 23 so that the stored energy is delivered to the filter capacitor 30 and the DC/DC converter 40.

Figure 3:
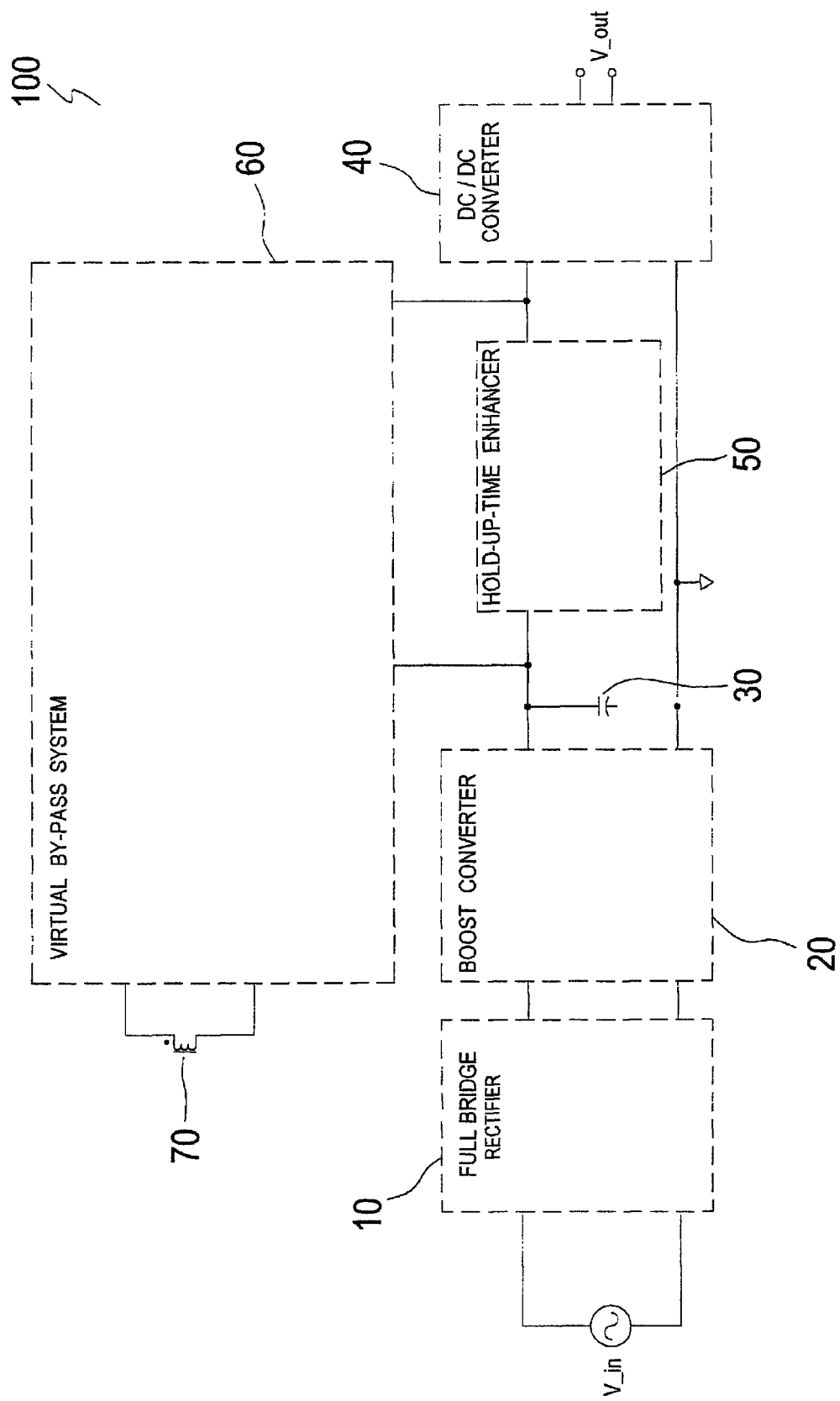
FIG. 3 is a functional diagram of a power supply with virtual by-pass system according to the present invention.

As shown in FIG. 3, a power supply 100 according to the present invention further contains a hold-up-time enhancer 50 and a virtual by-pass system 60, connected in parallel between the filter capacitor 30 and the DC/DC converter 40.

Figure 4:
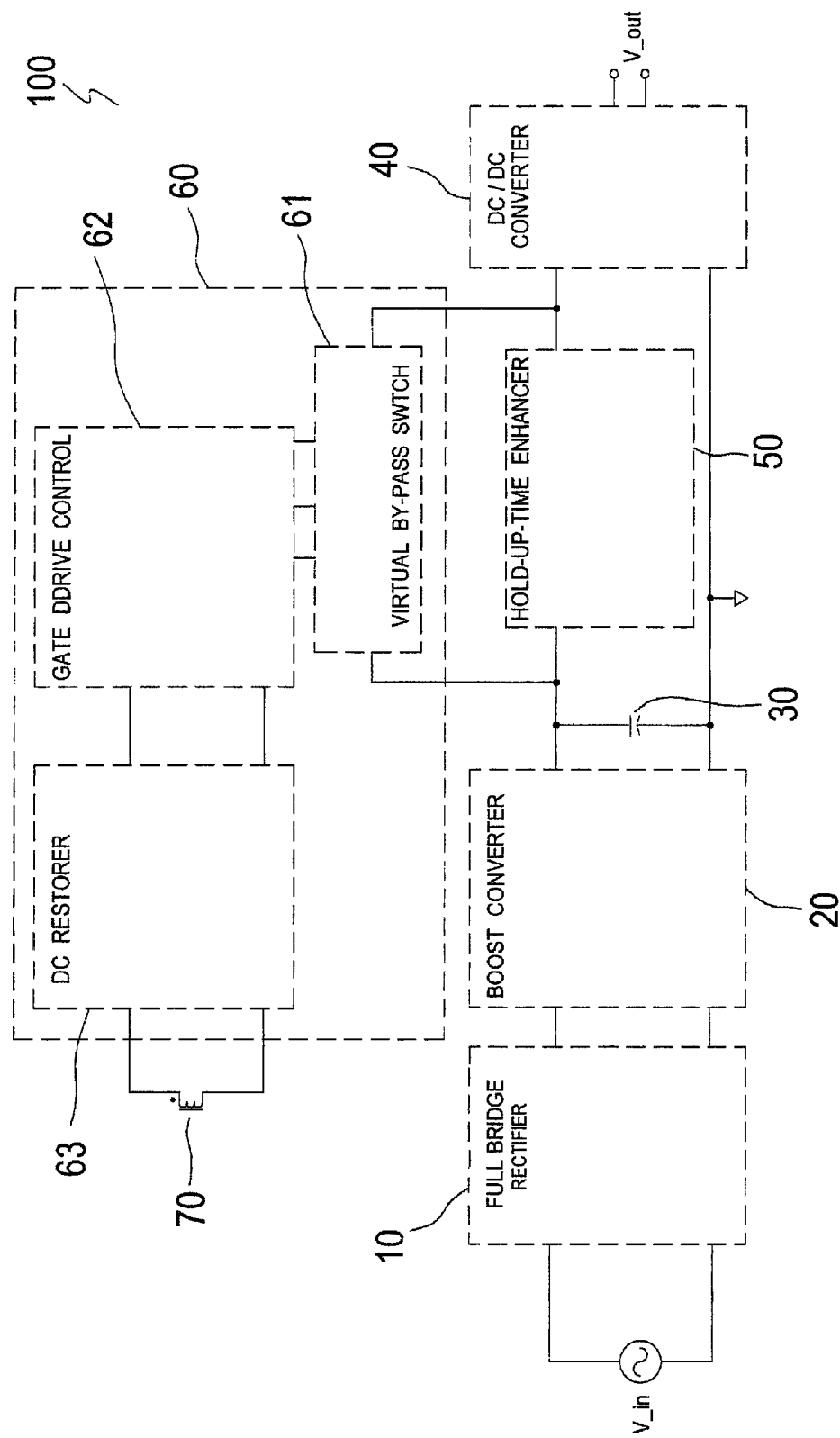
FIG. 4 is a more detailed functional diagram of the power supply with virtual by-pass system of FIG. 3.

As shown in FIG. 4, the virtual by-pass system 60 contains a virtual by-pass switch 61, a gate drive control 62, and a DC restorer 63.

Figure 5:
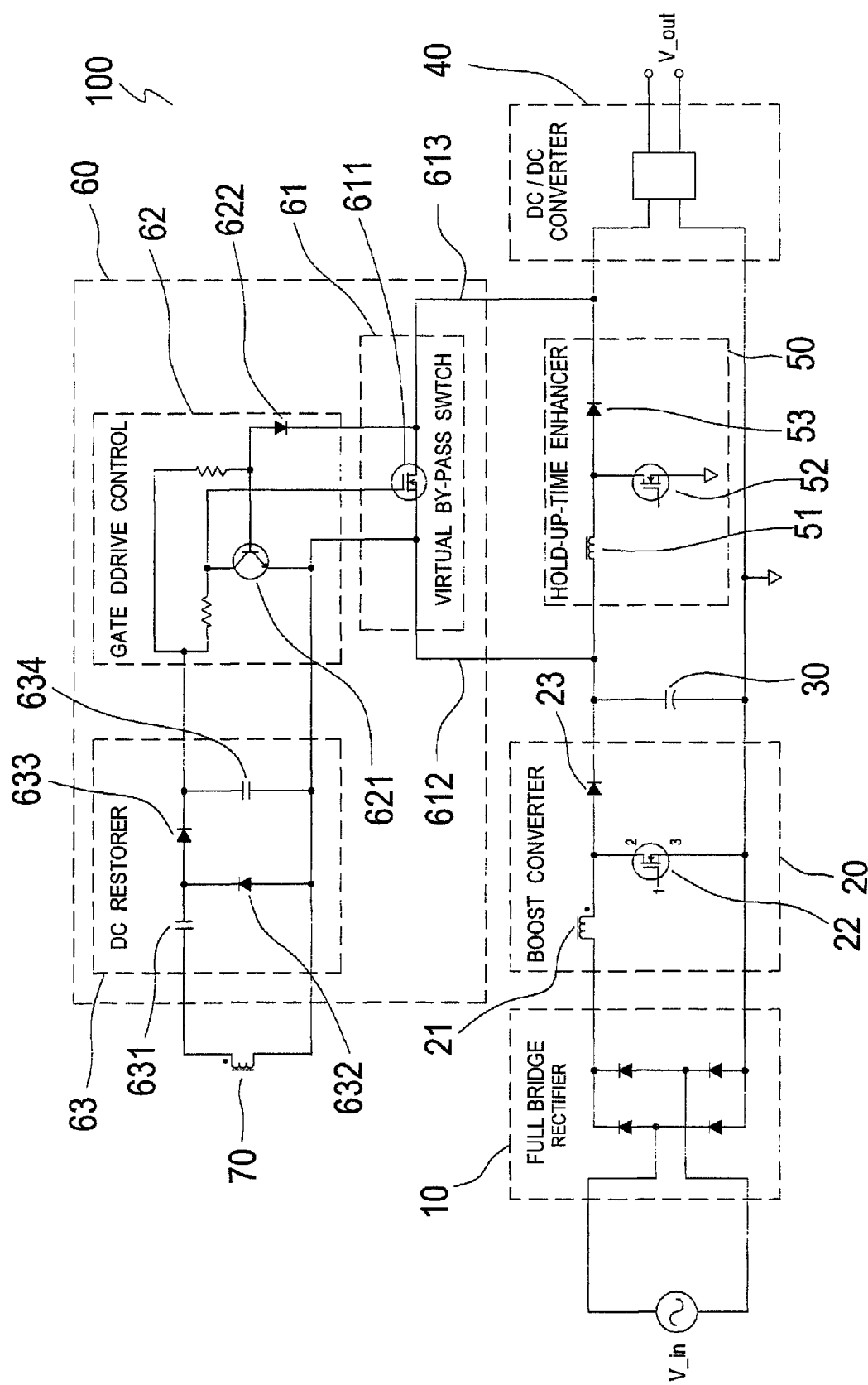
FIG. 5 is a schematic diagram of the power supply with virtual by-pass system of FIG. 4.

As shown in FIG. 5, the gate drive control 62 is connected to and positioned between the DC restorer 63 and the virtual by-pass switch 61. The virtual by-pass switch 61 has a first by-pass terminal 612 connected to the filter capacitor 30 and a second by-pass terminal 613 connected to the DC/DC converter 40.

The DC restorer 63 contains diodes 632, 633 and capacitors 631, 634, jointly forming a Greinacher-Schaltung circuit. The DC restorer 63 is connected to an induction coil 70 inductively coupled to the inductance coil 21 and thereby generates a magnified voltage on the gate drive control 62. The gate drive control 62 uses the collector and emitter of a BJT 621 as control, whose base is connected to the virtual by-pass switch 61 through a diode 622. The hold-up-time enhancer 50 contains an inductance coil 51, a FET 52, and a diode 53, configured just like the boost converter 20.

When the power supply operates in a general mode, as the hold-up-time enhancer 50's output voltage is configured slightly below the maximum peak voltage from the preceding boost converter 20, and is slightly greater than the minimum input voltage of the subsequent DC/DC converter 40, the hold-up-time enhancer 50 is not engaged. In the mean time, the hold-up-time enhancer 50's input and output are short-circuited to form a by-pass by the virtual by-pass switch 61. However, then the AC source V_in drops or the bridge rectifier 10 is turned off, the voltage on the capacitor 634 decays and the FET 611 of the virtual by-pass switch 61 is automatically turned off, thereby engaging the hold-up-time enhancer 50. In the present embodiment, the fast switching of the FET 611 is for the protection of the turned-on hold-up-time enhancer 50 and the virtual by-pass switch 61. When the hold-up-time enhancer 50 is engaged, the FET 52 starts switching and the inductance coil 51 produced reversed current by self induction. When the FET 611's current is revered, the positive voltage on its drain increases and the FET 611 is turned off when the positive voltage plus the diode 622 are capable of driving the BJT 621.

Therefore, during the hold-up time and as the energy in the filter capacitor 30 is depleted, the hold-up-time enhancer 50 adjusts its output voltage so that the DC/DC converter 40 maintains its output within a specified voltage range. The integration of the hold-up-time enhancer 50 and the virtual by-pass system 60 as such will significantly prolong the hold-up time without sacrificing the overall efficiency.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A power supply with virtual by-pass system, comprising:
    a bridge rectifier connected to an AC source;
    a boost converter series-connected to said bridge rectifier comprising an inductance coil;
    a filter capacitor series-connected to said boost converter;
    a DC/DC converter connected to a load;
    a hold-up-time enhancer connected to and positioned between said filter capacitor and said DC/DC converter; and
    a virtual by-pass system parallel-connected to said hold-up-time enhancer comprising an induction coil inductively coupled to said inductance coil of said boost converter.

2. The power supply with virtual by-pass system according to claim 1, wherein said virtual by-pass system further comprises:
    a virtual by-pass switch having a first by-pass terminal connected to said filter capacitor and a second by-pass terminal connected to said DC/DC converter;
    a DC restorer connected to said induction coil; and
    a gate drive control connected to and positioned between said virtual by-pass switch and said DC restorer.

3. The power supply with virtual by-pass system according to claim 1, wherein said boost converter further comprises a FET and a diode; and said FET is a MOSFET.

4. The power supply with virtual by-pass system according to claim 1, wherein said hold-up-time enhancer comprises an inductance coil, a FET, and a diode; and said FET is a MOSFET.

5. The power supply with virtual by-pass system according to claim 2, wherein said virtual by-pass switch comprises a FET; and said FET is a MOSFET.

6. The power supply with virtual by-pass system according to claim 2, wherein said gate drive control comprises at least a BJT and at least a diode.

* * * * *